(12) United States Patent
Ozyuksel et al.

(10) Patent No.: US 10,006,582 B2
(45) Date of Patent: Jun. 26, 2018

(54) HOUSEHOLD APPLIANCE WITH CONTROL HEIGHT ADJUSTMENT MECHANISM

(71) Applicant: ARCELIK ANONIM SIRKETI, Istanbul (TR)

(72) Inventors: Faik Emre Ozyuksel, Istanbul (TR); Kadir Ridvan Celik, Istanbul (TR); Mehmet Ercan Kaymak, Istanbul (TR); Erhan Kahraman, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 0 days. days.

(21) Appl. No.: 15/523,583

(22) PCT Filed: Nov. 3, 2014

(86) PCT No.: PCT/EP2014/073516
§ 371 (c)(1),
(2) Date: May 1, 2017

(87) PCT Pub. No.: WO2016/070890
PCT Pub. Date: May 12, 2016

(65) Prior Publication Data
US 2017/0314725 A1    Nov. 2, 2017

(51) Int. Cl.
*F16M 7/00* (2006.01)
*F25D 23/00* (2006.01)
(Continued)

(52) U.S. Cl.
CPC .......... *F16M 7/00* (2013.01); *A47L 15/4253* (2013.01); *D06F 39/125* (2013.01); *F16H 1/16* (2013.01);
(Continued)

(58) Field of Classification Search
CPC ....... F16M 7/00; A47L 15/4253; A47L 15/42; D06F 39/125; D06F 39/12; F16H 1/16;
(Continued)

(56) References Cited

U.S. PATENT DOCUMENTS 5,967,472 A * 10/1999 Wilhelmstatter .... A47B 91/028
248/188.2
7,258,313 B2 * 8/2007 Gabriel ............... A47L 15/4253
248/188.2
(Continued)

FOREIGN PATENT DOCUMENTS

DE   202004017329 U1   3/2006
WO      2004107914 A1   12/2004
WO      2011080230 A1    7/2011

OTHER PUBLICATIONS

International search report and written opinion, dated Jun. 30, 2015, of corresponding International Application No. PCT/EP2014/073516; 13 pgs.

*Primary Examiner* — Gwendolyn W Baxter
(74) *Attorney, Agent, or Firm* — Kilpatrick Townsend & Stockton LLP

(57) ABSTRACT

A household appliance having a plurality of feet with height adjustment mechanisms is provided. Each height adjustment mechanism comprising a base portion resting on the floor in connection with a base extension shaft, the base extension shaft being displaceable relative to a foot connection body so as to determine the height of the household appliance. The height adjustment mechanism includes a ring gear mechanically coupled with the base extension shaft so as to be mutually rotatable in engagement. A guide shell is provided so as to be enclosing the ring gear and the worm gear maintaining the two in a mutually interengaging mechanical
(Continued)

Figure 1:
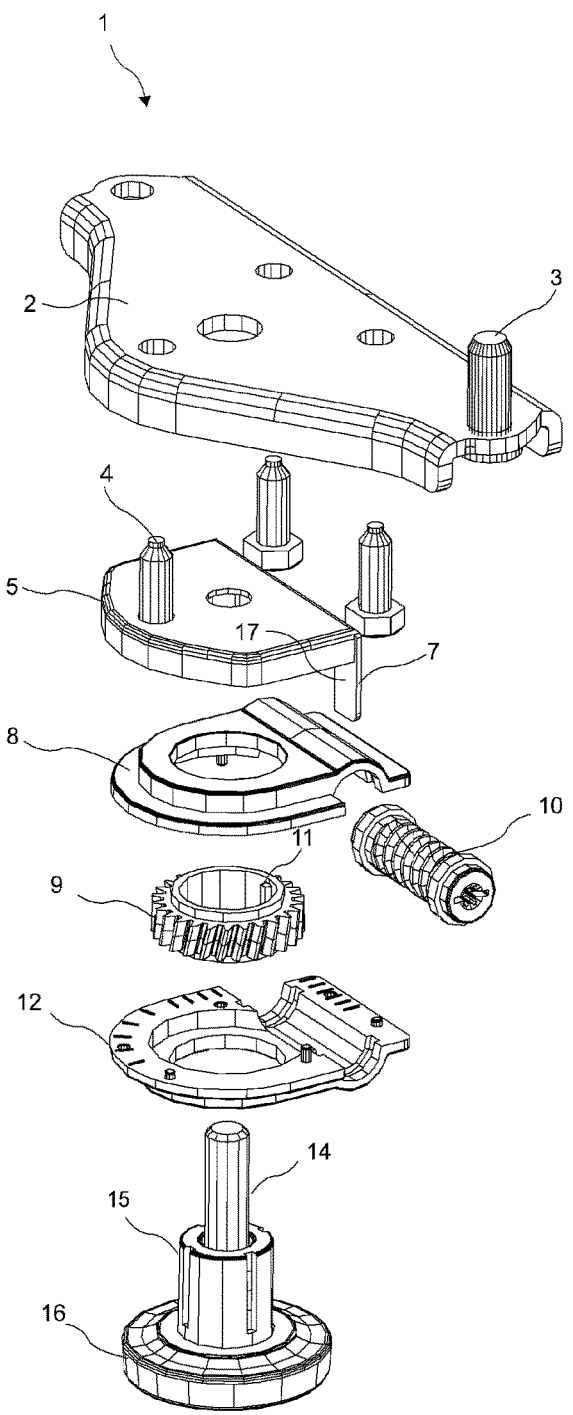

relationship and said guide shell is fitted within an operating space of a stopper to be held in fixed position by restriction brackets of the stopper.

12 Claims, 9 Drawing Sheets

(51) Int. Cl.
*D06F 39/12* (2006.01)
*A47L 15/42* (2006.01)
*F16H 57/039* (2012.01)
*F16H 1/16* (2006.01)

(52) U.S. Cl.
CPC ........... *F16H 57/039* (2013.01); *F25D 23/00* (2013.01); *F25D 2323/0011* (2013.01)

(58) Field of Classification Search
CPC ... F25D 23/00; F25D 2323/0011; A47B 91/02
USPC .............................. 248/188.4, 649, 650, 688
See application file for complete search history.

(56) References Cited

U.S. PATENT DOCUMENTS

| | | | |
|---|---|---|---|
| 8,695,933 B2 * | 4/2014 | Gennaretti | A47L 15/4253 248/188.2 |
| 2003/0136887 A1 | 7/2003 | Gabriel | |

* cited by examiner

HOUSEHOLD APPLIANCE WITH CONTROL HEIGHT ADJUSTMENT MECHANISM

RELATED APPLICATIONS

This application is a U.S. National Phase of International Application No. PCT/EP2014/073516, filed Nov. 3, 2014, the entire disclosure of which is incorporated by reference herein.

The present invention is related to a household appliance wherein the height is adjusted quickly by leveling the feet from the front side of the supporting body.

The feet of the household appliances are desired to be easily adjustable to the floor conditions. Household appliances with unbalanced feet may result in that the user experiences difficulty in operating the door of the appliance. This is primarily caused by unstable positioning of the appliance also adversely affecting performance and usability thereof. Therefore, in household appliances such as refrigerators, laundry washing machines or dishwashers, the feet on which the body of the appliance is carried and supported may require height adjustment. This may especially the case in the event that the appliance is moved to a new location.

The household appliance is typically balanced by leveling the feet. However, the adjusted distance with respect to the floor can easily change in height due to movement of the appliance for various reasons such as for cleaning purposes or during moving to another place/room.

The height adjustment of the feet is typically made by rotating the foot around its axis by means of a wrench. But it is to be noted that height adjustment may require longer time than expected for appropriately positioning all the feet of the appliance. Adjustment of the height can become particularly troublesome due to the weight of the appliance and also depending on the availability of the working space so that one can work with the wrench to adjust height.

Therefore, practically easy and quick height adjustment of household appliances is desirable. A practically quick height arrangement would preferably be performed independent from the housing of the appliance and would allow the user an easy access to the feet of the appliance without dismantling various components so that no interference to the appliance is needed and an easy height adjustment process can be effected.

Therefore, the present invention proposes a height adjustment mechanism which can be adjusted from the front-side of the appliance so as to allow easy access for level adjusting and maintenance. Further, undesired situations such as difficulty in opening the appliance door due to weight unbalance between the front and rear sides are overcome. The present invention is also devised under the recognition that the height adjustment mechanism should ensure that the upper height limit one can adjust is restricted.

A prior art publication relevant in the technical field of the present invention may be referred to as DE202004017329U1, among other, the document disclosing a height-adjustable foot for a household appliance such as refrigerators, the appliance comprising a threaded shaft with a base plate and worm wheel engaging a shaft portion and a worm gear engaged with the wheel and fixed to a drive shaft. A force-fitted part prevents the shaft turning in the direction of the housing.

The present invention provides a household appliance comprising a height adjustment mechanism providing the height of the appliance's feet to be adjusted in a practical manner as defined by the characterizing features in claim 1 and subsequent Claims.

Primary object of the present invention is hence to provide a height adjustment mechanism providing the height of the appliance's feet to be adjusted in a practical manner.

The present invention proposes a household appliance with a guide shell which defines an inner region having a ring gear and a worm gear, the two being maintained in engagement thanks to the enclosing structure, i.e. the guide shell. A stopper connected to a foot connection body has two restriction brackets in equal length and in parallel such that the guide shell is fitted in an operating space of the stopper. This provides that the guide shell remains fixed in response to the rotation of the two gears inside the same.

The stopper is a detachable piece such that when removed, the remaining parts, i.e. a base extension shaft and a base portion are rotatable to provide manual height adjustment function. The stopper can be then, together with the guide shell, installed to a foot of another appliance for the sake of performing easier height adjustment.

The ring gear mechanically communicates with the base extension shaft by means of protrusions engaging with grooves of the base extension shaft.

The guide shell being a dismantled structure with upper and lower connection bodies allows easier access to and mounting of respective gears.

The reciprocating teeth of the ring gear and the worm gear mesh with each other in an inclined orientation.

Maximum amount of height as set by the height adjustment mechanism is dictated by the length of the restriction brackets of the stopper. The operating space between the two restriction brackets ensures stationary operation of the guide shell until the adjusted height of the appliance exceeds the length of the two restriction brackets.

Accompanying drawings are given solely for the purpose of exemplifying a household appliance whose advantages over prior art were outlined above and will be explained in brief hereinafter.

The drawings are not meant to delimit the scope of protection as identified in the claims nor should they be referred to alone in an effort to interpret the scope identified in the claims without recourse to the technical disclosure in the description of the present invention.

FIG. 1 demonstrates a general perspective view of the components of the height adjustment mechanism in an unassembled manner according to the present invention.

Figure 2:
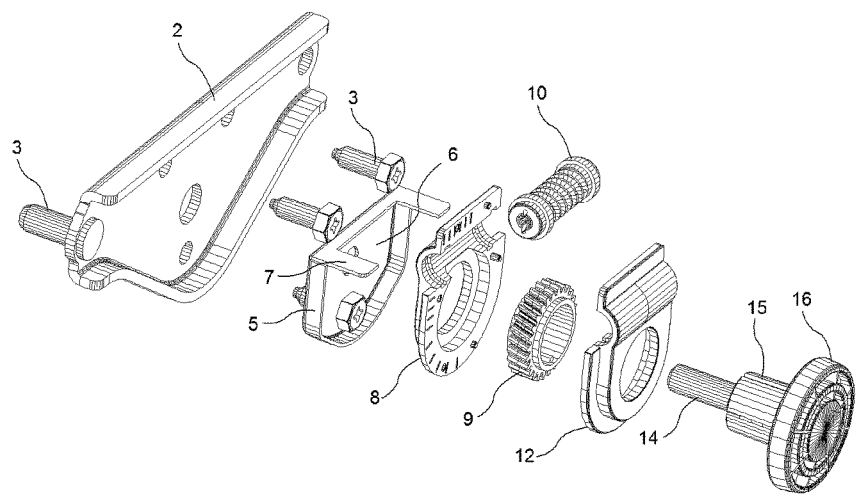

FIG. 2 demonstrates another perspective view of the components of the height adjustment mechanism in an unassembled manner according to the present invention.

Figure 3:
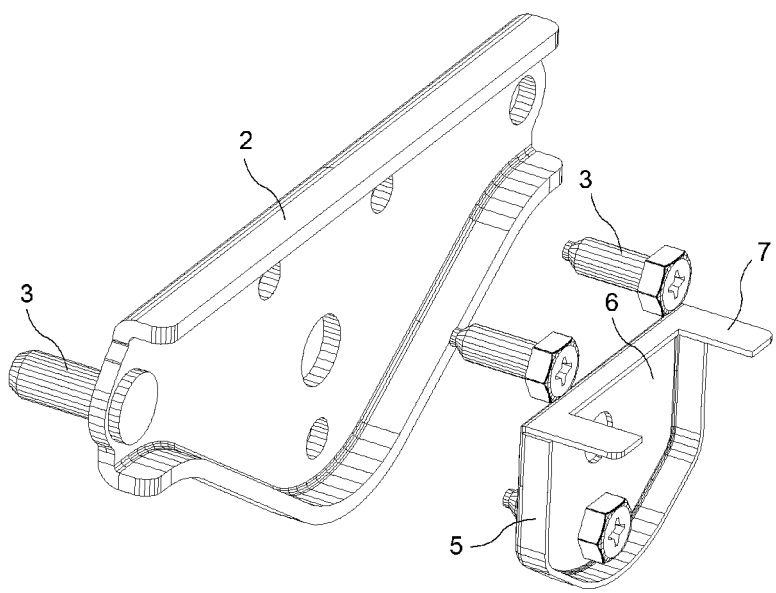

FIG. 3 demonstrates a perspective view of a foot connection body with a stopper in an unassembled condition according to the present invention.

Figure 4:
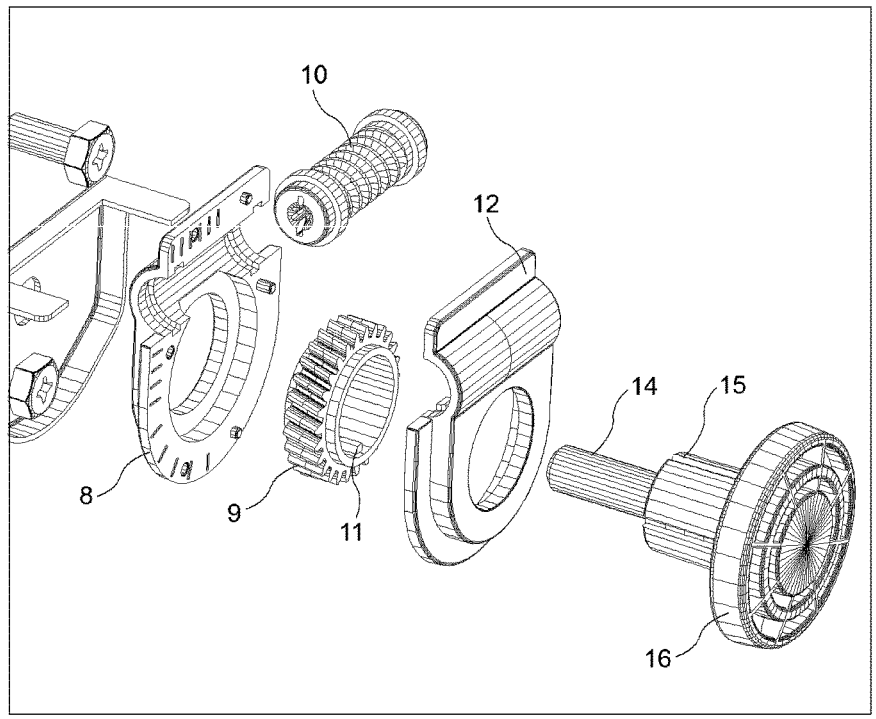

FIG. 4 demonstrates a perspective view of the connection of a base extension shaft to a ring gear and connection bodies according to the present invention.

Figure 5:
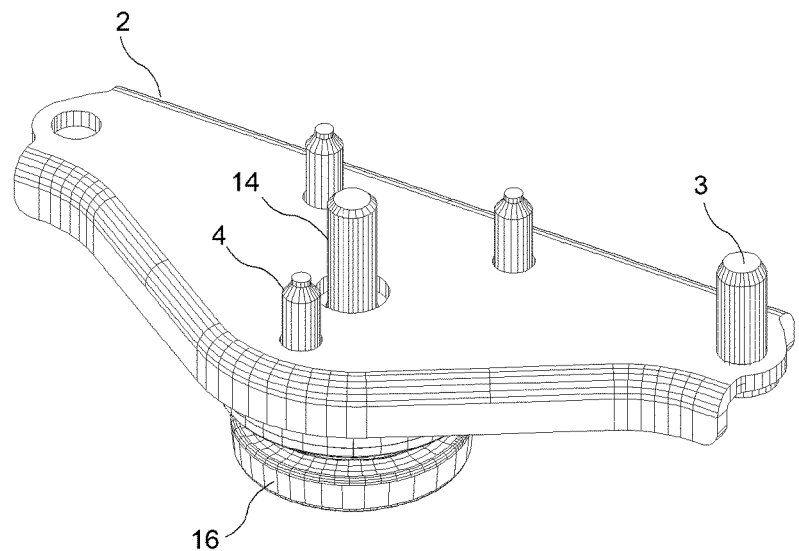
Figure 6:
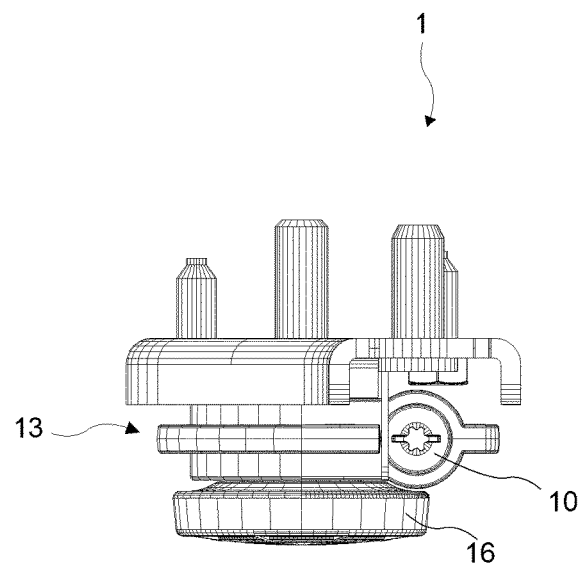

FIG. 5 demonstrates an upper side perspective view of the base extension shaft connected to the foot connection body according to the present invention FIG. 6 demonstrates a side view of the height adjustment mechanism in an assembled manner according to the present invention.

Figure 7:
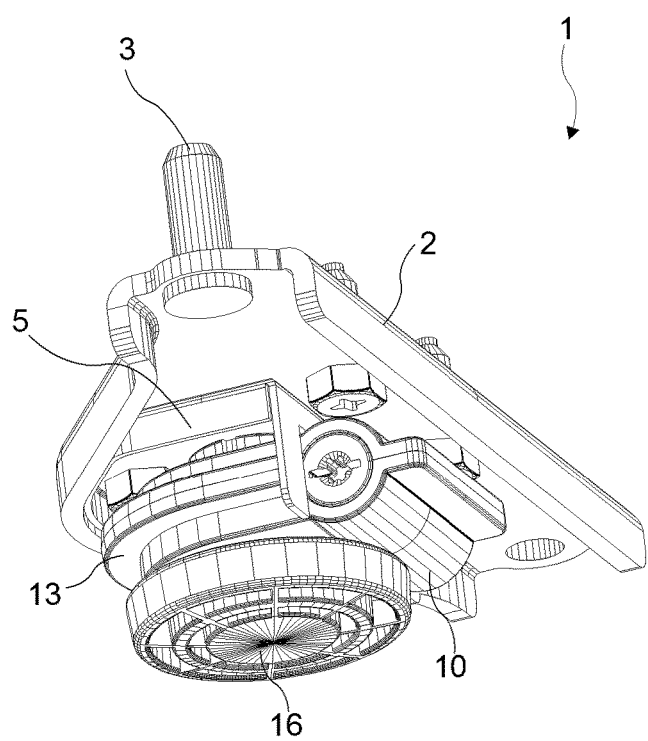

FIG. 7 demonstrates a lower side perspective view of the components of the height adjustment mechanism in an assembled manner according to the present invention.

Figure 8:
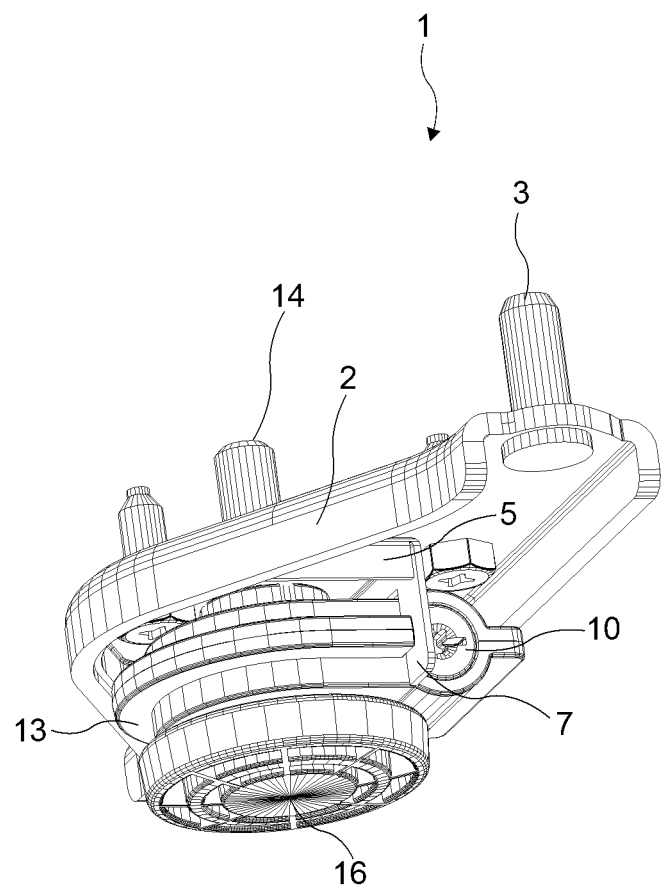

FIG. 8 demonstrates another lower side perspective view of the components of the height adjustment mechanism in an assembled manner according to the present invention.

Figure 9:
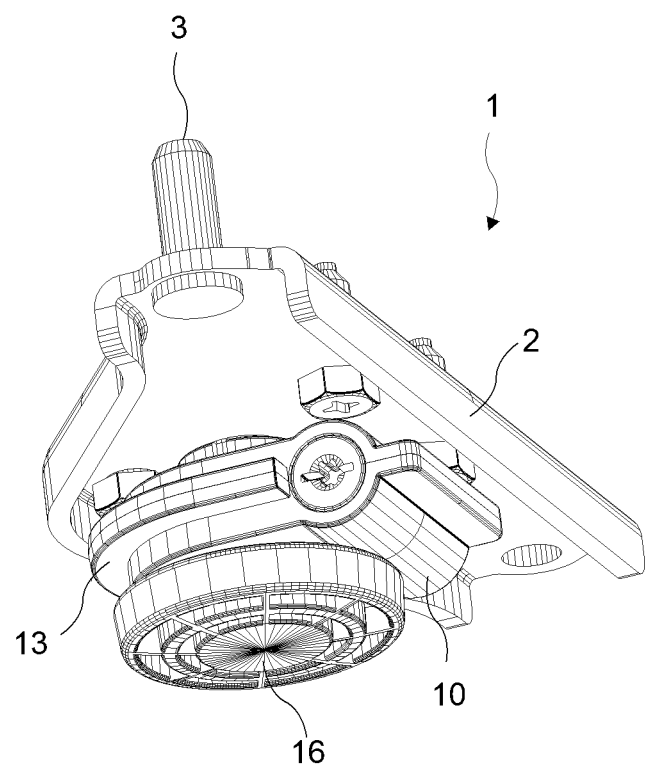

FIG. 9 demonstrates a lower side perspective view of the connection of a base portion and the foot connection body without the stopper according to the present invention.

Figure 10:
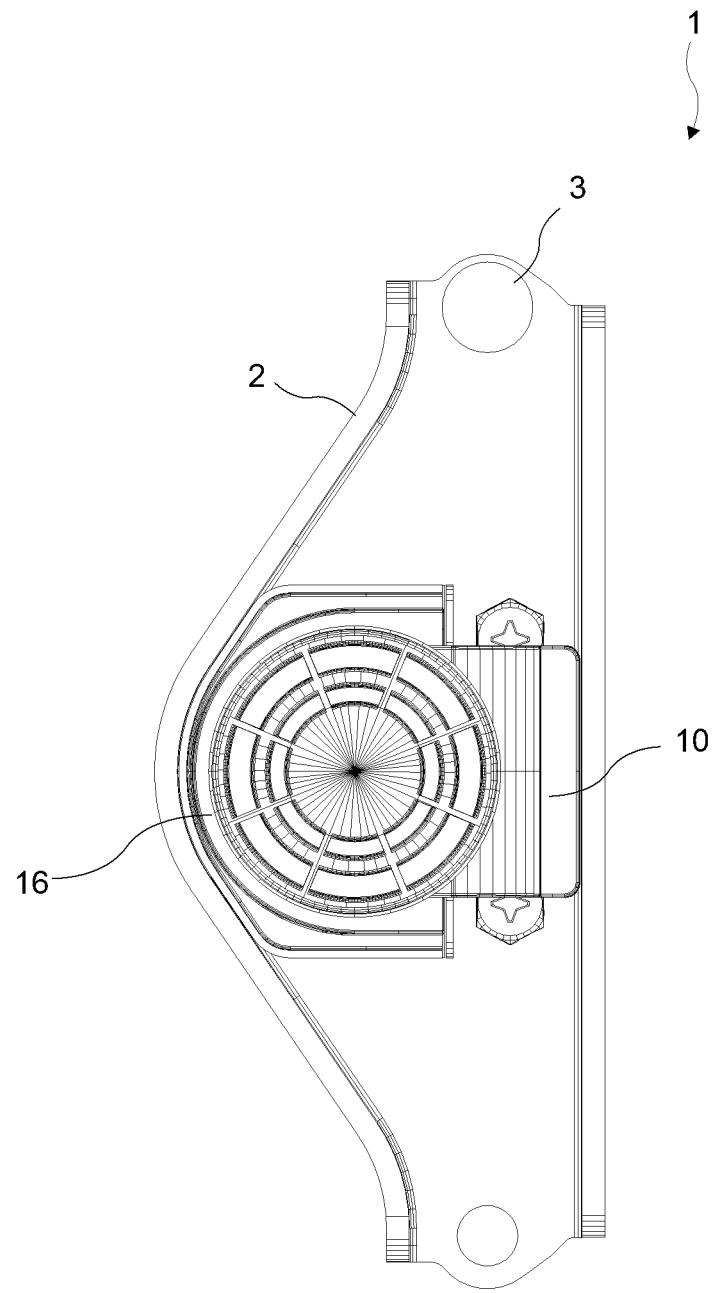

FIG. 10 demonstrates a bottom view of the base portion connected to the foot connection body according to the present invention.

The following numerals assigned to different parts as demonstrated in the technical drawings are referred to in the detailed description:
1) Height adjustment mechanism
2) Foot connection body
3) Base connection means
4) Stopper connection means
5) Stopper
6) Operating space
7) Restriction brackets
8) Upper connection body
9) Ring gear
10) Worm gear
11) Protrusions
12) Lower connection body
13) Guide shell
14) Base extension shaft
15) Grooves
16) Base portion
17) Contact surface The present invention relates to a household appliance and more particularly a refrigeration appliance having a foot adjustment mechanism as explained hereafter.

The height adjustment mechanism (1) is realized in the form of a threaded main shaft as a base extension shaft (14) on which a ring gear (9) being rotatable by a worm gear (10) is provided. The ring gear (9) is coupled with the base extension shaft (14) through peripheral protrusions (11) engaging with grooves (15) of a base portion (16), the base extension shaft (14) thus being able to be rotated in engagement therewith.

The base extension shaft (14) extends upwardly in the direction of a foot connection body (2) which is fixed to the body of the appliance. The base extension shaft (14) extends through the ring gear (9), which is rotated by the worm gear (10) that is directly accessible to the user. The height adjustment mechanism (1) of the invention therefore provides height adjustment through the worm gear (10) such that the rotation thereof by the user changes the position of the base extension shaft (14) up and down relative to the foot connection body (2), thus adjusting the height of the appliance.

An upper connection body (8) and a lower connection body (12) together form a guide shell (13) fitted inside a stopper (5) to be held in a fixed position by a pair of oppositely positioned restriction brackets (7). The resulting guide shell (13) has a cylindrical portion enclosing the worm gear (10) and a circular cross-sectional portion enclosing the ring gear (9) to have an interengaging contact relationship between the ring gear (9) and the worm gear (10).

The rotation of the worm gear (10) turning the ring gear (9) and thus rotating the base extension shaft (14) continues as long as the guide shell (13) remains inside an operating space (6) of the stopper (5). The height adjustment is possible as much as the operating space (6) of the stopper (5) allows it. At the point where the guide shell (13) gets released from the pair of restriction brackets (7) of the operating space (6), it starts rotating with the base portion (16) and the worm gear (10) is no longer functional to perform height adjustment by the user. Therefore, the guide shell (13) formed by connection of the upper and lower connection bodies (8, 12) so as to obtain an easily mountable structure with two connection body halves enclose the ring gear (9) and the worm gear (10) in an interengaging relationship.

The stopper (5) having the restriction brackets (7) can be removed from the foot connection body (2) allowing that the user can manually perform adjustment of the height by means of the remaining components, by way of rotating the base portion (16) itself. Therefore, it is also possible to operate the height adjustment mechanism (1) while the stopper (5) is not attached to the foot connection body (2).

Accordingly, the present invention proposes a stopper (5) that is detachable from the foot connection body (2) enabling manual rotation of the remaining base portion (16) for height adjustment. This is advantageous in the case of an appliance having no stoppers (5) and especially if height adjustment is needed for a foot with a limited working space such as for instance if the concerned foot is near the wall or at the corner of a room. In this case a stopper (5) of an appliance can be removed together with the guide shell (13) to perform height adjustment of another appliance. The stoppers (5) can be easily fitted to different foot connection bodies (2) in association with different appliances with standard stopper connection means (4).

The present invention ensures that the maximum amount of height that can be set is limited due the stopper (5) having the restriction brackets (7). The guide shell (13) fitted inside the stopper (5) provides that the operating space (6) defined by the region between the two restriction brackets (7) restricts operability of the height adjustment mechanism (1) from the point at which the adjusted height reaches a predetermined upper limit. This upper limit is determined by the longitudinal dimension of the restriction brackets (7) relative to the floor. In other words, when the guide shell (13) gets released from the pair of restriction brackets (7) of the operating space (6), it is freely rotatable together with the base portion (16) around its center such that the user will not be able to effectuate rotation of the ring gear (9) as the mechanical relationship between the worm gear (10) and the ring gear (9) having an inclined meshing engagement within the guide shell (13) ensures that the rotational movement can be imparted to the system only through the worm gear (10).

The present invention advantageously provides that the restriction brackets (7) restricts rotation of the guide shell (13) by means of a contact surface (17) leaning on a peripheral flange portion of the guide shell (13) and having a surface normal perpendicular to the axis of the worm gear (10).

Accordingly, the present invention provides a height adjustment mechanism (1) by which the level of height the user can adjust is limited due to the guide shell (13) and restriction brackets (7) of the stopper (5) so as to ensure a safe adjustment range.

The household appliance of the invention have four feet, two at the front and two at the rear sides as carried by means of base extension shafts (14). With the proposed system, the height of the feet can be adjusted by a regular hand tool through the worm gear (10) which can be easily accessed from the front side of the appliance.

The upper connection body (8) attached to the lower connection body (12) enclosing in between the set of worm gear (10) and ring gear (9) as an attached group is passed over the base extension shaft (14) and the resulting assembled structure is placed between the restriction brackets (7) of the stopper (5) where the ring gear (9) is rotatable in response to the rotation of the worm gear (10) inside the guide shell (13) being maintained by the restriction brackets (7) in a stationary manner. The base portion (16) then displaces relative to the foot connection body (2), which is in turn fixedly attached to the appliance body. The foot connection body (2) is connected with the base extension shaft (14) in a threaded relationship. The structural engagement relationship inside the guide shell (13) ensures that the weight of the household appliance effects height adjustment in a minimal manner because the rotational movement is transferred to the base portion (16) in parallel to the floor surface. Base connection means (3) and stopper connection means (4) are used to provide mechanical fixing.

In a nutshell, the present invention proposes a household appliance having a plurality of feet having height adjustment mechanisms (1), each height adjustment mechanism (1) comprising a base portion (16) resting on the floor in connection with a base extension shaft (14), the base extension shaft (14) being displaceable relative to a foot connection body (2) so as to determine the height of the household appliance, the height adjustment mechanism (1) further comprising a ring gear (9) being rotatable by means of a worm gear (10) meshed therewith and being mechanically coupled with the base extension shaft (14) so as to be mutually rotatable in engagement In one embodiment of the present invention, a guide shell (13) is provided so as to be enclosing the ring gear (9) and the worm gear (10) maintaining the two in a mutually interengaging mechanical relationship and the guide shell (13) is fitted within an operating space (6) of a stopper (5) to be held in fixed position by restriction brackets (7) of the stopper (5). Therefore, the stopper (5) ensures that the guide shell (13) does not rotate with the base portion (16) and height adjustment is possible.

In accordance with a further embodiment of the present invention, the stopper (5) has oppositely positioned restriction brackets (7) in the manner that the guide shell (13) is maintained by the restriction brackets (7) in a stationary manner in response to the rotary movement of the worm gear (10) and the ring gear (9).

In accordance with a further embodiment of the present invention, the stopper (5) is detachable from the foot connection body (2) such that height adjustment is performable upon detachment of the stopper (5) by way of rotating the base portion (16). Removed stopper (5) and guide shell (13) can be fitted to another appliance for height adjustment.

In accordance with a further embodiment of the present invention, the base extension shaft (14) on which the ring gear (9) is rotatable by the worm gear (10) comprises a threaded part in cooperative engagement with the foot connection body (2) that is fixedly attached to the household appliance.

In accordance with a further embodiment of the present invention, the ring gear (9) is mechanically coupled with the base extension shaft (14) by means of protrusions (11) in engagement with respective grooves (15) around the base extension shaft (14).

In accordance with a further embodiment of the present invention, the guide shell (13) has a first cylindrical portion enclosing the worm gear (10) and a second circular cross-sectional portion enclosing the ring gear (9) so as to establish a mechanically interengaging contact relationship between the ring gear (9) and the worm gear (10).

In accordance with a further embodiment of the present invention, the guide shell (13) is a dismantled structure comprises upper and lower connection bodies (8, 12) in the form of connection body halves to enclose the ring gear (9) and the worm gear (10) in an interengaging relationship. This is especially advantageous for easy access to replace worn-out parts.

In accordance with a further embodiment of the present invention, teeth of the ring gear (9) are shaped to be inclined with respect to the surface planes defined by two open ends of the ring gear (9).

In accordance with a further embodiment of the present invention, the worm gear (10) and the ring gear (9) have an inclined meshing engagement within the guide shell (13).

In accordance with a further embodiment of the present invention, maximum amount of height as set by the height adjustment mechanism (1) is restricted by the restriction brackets (7) of the stopper (5) such that the operating space (6) defined by the region between the two restriction brackets (7) restricts operability of the height adjustment mechanism (1) while the adjusted height exceeds predetermined length of the two restriction brackets (7).

In accordance with a further embodiment of the present invention, the restriction brackets (7) restrict rotation of the guide shell (13) by means of a contact surface (17) leaning on the guide shell (13) and having a surface normal perpendicular to the longitudinal axis of the worm gear (10). The relative position arrangement of the contact surface (17) provides a more balanced load distribution and sturdy structure.

In accordance with a further embodiment of the present invention, the guide shell (13) is configured to have a closed-enclosure shell.

Therefore, the structural engagement relationship inside the guide shell (13) according to the invention ensures that the weight of the household appliance effects height adjustment in a minimal manner. The detachability of the stopper (5) advantageously provides flexibility as to the use of the height adjustment mechanism (1) with and without the stopper (5). The stopper (5) of an appliance can be removed together with the guide shell (13) to be used in adjusting height of another appliance with a foot connection body (2) having standard stopper connection means (4). The stopper (5) and the guide shell (13) of a first appliance will be sufficient for easy height adjustment of a second appliance with no stopper (5) or guide shell (13) because the base portion (16) and the base extension shafts (4) are typically standard in different appliances.

The invention claimed is:

1. A household appliance having a plurality of feet having height adjustment mechanisms, each height adjustment mechanism comprising a base portion resting on the floor in connection with a base extension shaft, the base extension shaft being displaceable relative to a foot connection body so as to determine the height of the household appliance, the height adjustment mechanism further comprising a ring gear being rotatable by means of a worm gear meshed therewith and being mechanically coupled with the base extension shaft so as to be mutually rotatable in engagement, characterized in that a guide shell is provided so as to be enclosing the ring gear and the worm gear maintaining the two in a mutually interengaging mechanical relationship and said guide shell is fitted within an operating space of a stopper to be held in fixed position by restriction brackets of the stopper, the restriction brackets restrict rotation of the guide shell by means of a contact surface leaning on the guide shell and having a surface normal perpendicular to longitudinal axis of the worm gear.

2. A household appliance as in claim 1, characterized in that the stopper has oppositely positioned restriction brackets in the manner that the guide shell is maintained by the restriction brackets in a stationary manner in response to the rotary movement of the worm gear and the ring gear.

3. A household appliance as in claim 2, characterized in that maximum amount of height as set by the height adjustment mechanism is restricted by the restriction brackets of the stopper such that the operating space defined by the region between the two restriction brackets restricts operability of the height adjustment mechanism while the adjusted height exceeds predetermined length of the two restriction brackets.

4. A household appliance as in claim 1, characterized in that the stopper is detachable from the foot connection body such that height adjustment is performable by way of rotating the base portion.

5. A household appliance as in claim 1, characterized in that the base extension shaft on which the ring gear is rotatable by the worm gear comprising a threaded part in cooperative engagement with the foot connection body that is fixedly attached to the household appliance.

6. A household appliance as in claim 1, characterized in that the ring gear is mechanically coupled with the base extension shaft by means of protrusions in engagement with respective grooves around the base extension shaft.

7. A household appliance as in claim 1, characterized in that the guide shell has a first cylindrical portion enclosing the worm gear and a second circular cross-sectional portion enclosing the ring gear so as to establish a mechanically interengaging contact relationship between the ring gear and the worm gear.

8. A household appliance as in claim 1, characterized in that the guide shell is a dismantled structure comprising upper and lower connection bodies in the form of connection body halves to enclose the ring gear and the worm gear in an interengaging relationship.

9. A household appliance as in claim 1, characterized in that the teeth of the ring gear are shaped to be inclined with respect to the surface planes defined by two open ends of the ring gear.

10. A household appliance as in claim 9, characterized in that the worm gear and the ring gear have an inclined meshing engagement within the guide shell.

11. A household appliance as in claim 10, characterized in that the guide shell is configured to have a closed-enclosure shell.

12. A household appliance as in claim 1, characterized in that the household appliance is a refrigerator or a laundry treatment appliance.

* * * * *